United States Patent [19]

Fine

[11] 3,851,443

[45] Dec. 3, 1974

[54] CAN SEAL APPLIER

[75] Inventor: Harry Harold Fine, Kew Garden Hills, N.Y.

[73] Assignee: The Schlegel Manufacturing Company, Rochester, N.Y.

[22] Filed: May 7, 1973

[21] Appl. No.: 357,824

[52] U.S. Cl................ 53/139.3, 53/198 R, 53/211, 156/446, 156/583
[51] Int. Cl............................................ B65b 13/16
[58] Field of Search....... 53/137, 139.3, 198 R, 204, 53/211, 214, 215, 234; 156/446, 447, 458, 521, 583

[56] References Cited
UNITED STATES PATENTS

| 1,772,164 | 8/1930 | Taft | 53/215 X |
| 2,877,612 | 3/1959 | Berney | 53/211 X |
| 3,162,564 | 12/1964 | Buchner | 156/583 |
| 3,577,293 | 5/1971 | Ritterhoff | 53/211 |
| 3,659,394 | 5/1972 | Hartleib | 53/214 X |
| 3,676,271 | 7/1972 | Hake | 53/139.3 X |
| 3,704,566 | 12/1972 | Zimmermann | 53/33 X |

FOREIGN PATENTS OR APPLICATIONS

| 1,154,335 | 9/1963 | Germany | 156/446 |
| 580,935 | 8/1959 | Canada | 53/215 |
| 21,251 | 2/1935 | Australia | 53/214 |

Primary Examiner—Travis S. McGehee
Assistant Examiner—John Sipos
Attorney, Agent, or Firm—Cumpston, Shaw & Stephens

[57] ABSTRACT

A can seal applier has an indexing mechanism carrying endless belt and pulley sets at four stations. The pulley sets include a pair of movable pulleys that close on opposite sides of the can and wrap the belt around the can to hold the can on the indexing mechanism and rotate the can at a seal wrapping station. A continuous length of seal is fed to a vacuum gripper wheel, and a knife cuts off a length of the seal that is wrapped around the can by the gripper wheel as the can rotates. At another station a gripper draws the free ends of the seal together for joining by a fuser, and at another station the movable pulleys are spread apart to release the can and move it off the indexing mechanism.

7 Claims, 1 Drawing Figure

PATENTED DEC 3 1974
3,851,443
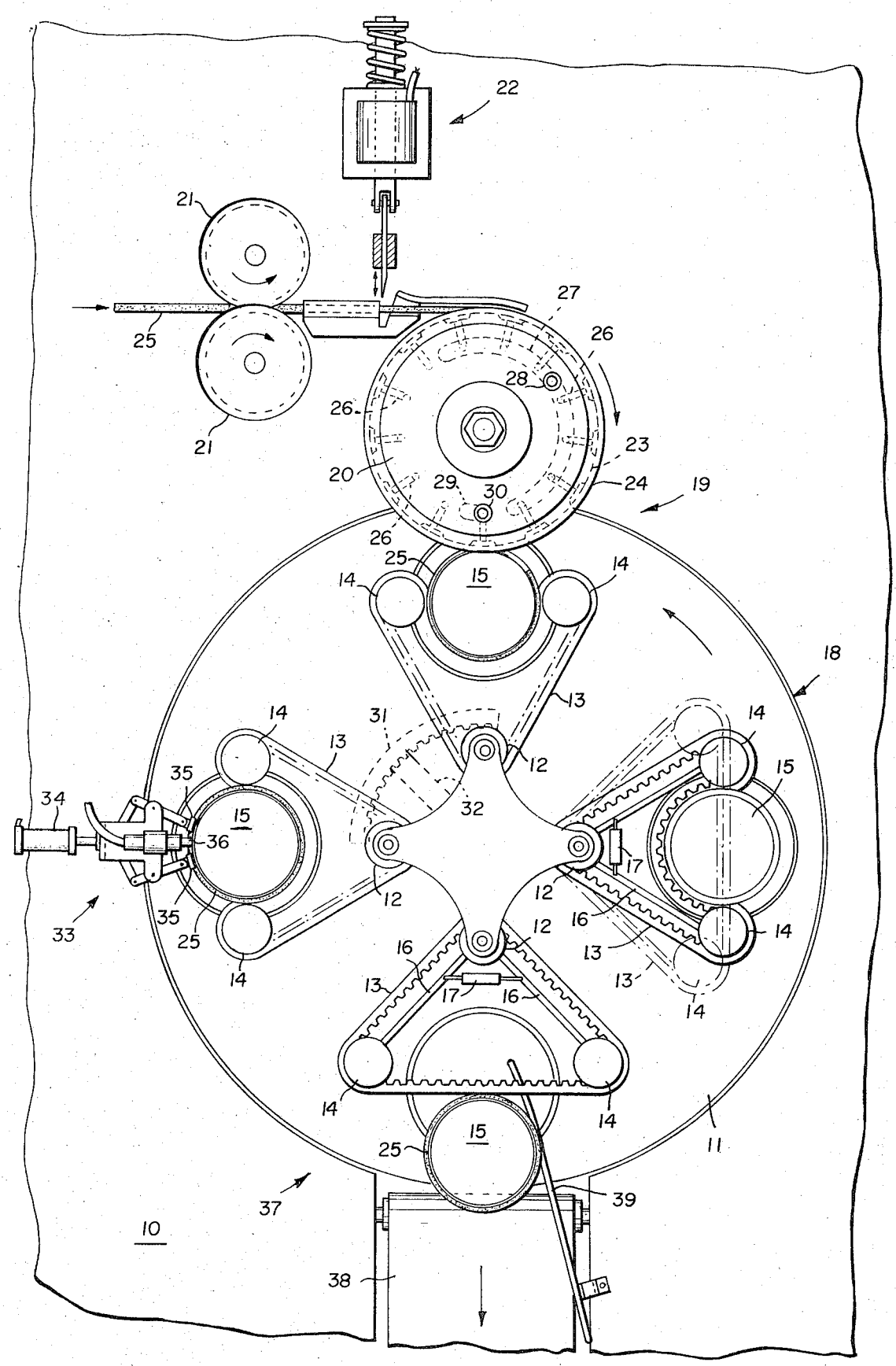

3,851,443

CAN SEAL APPLIER

THE INVENTIVE IMPROVEMENT:

Sealing strips have been developed for the rims of cans such as paint cans, and such sealing strips have many advantages over the conventional metal seals on such cans. The new seals are formed as continuous strips of plastic material and lengths of the seal have to be cut off and applied to each can in a fast and efficient manner. There have been several suggestions for this, but the invention proposes an optimum solution in a seal applier that is fast, efficient, economical, reliable, and trouble-free.

SUMMARY OF THE INVENTION

The inventive seal applier has an indexing mechanism and a plurality of endless belt and pulley sets arranged at four stations around the indexing mechanism. Each of the pulley sets includes a drive pulley and a pair of movable idler pulleys, and the indexing mechanism includes means for closing the movable pulleys against opposite sides of the can at a first station to wrap an endless belt around half of the cylindrical circumference of the can to hold the can on the indexing mechanism. A continuous seal is fed to a vacuum gripper wheel at a second station, and lengths of the seal strip are cut off to fit the can. The drive pulley rotates at the second station to rotate the can with the belt, and a vacuum gripper wheel rotates with the can at the second station to wrap the seal around the can. At a third station, the free ends of the wrapped seal are gripped and joined together, and the movable pulleys are opened at a fourth station to release the can and move it off the indexing mechanism.

DRAWINGS:

The drawing shows a partially schematic, plan view of a preferred embodiment of the inventive seal applier.

DETAILED DESCRIPTION:

Seal applier 10 includes an indexing mechanism formed as a turntable 11 having four stations as illustrated. Each station has a drive pulley 12, an endless belt 13, and a pair of movable idler pulleys 14. Pulleys 14 can be moved from a spread-apart position to a position closed against opposite sides of a can 15 as illustrated, and pivoted arms 16 and pneumatic cylinder 17 schematically represent a mechanism for moving pulleys 14. Other devices for opening and closing pulleys 14 can also be used as will be appreciated by those skilled in the art.

Can 15 is fed onto turntable 11 at a first station 18 where it moves in between idler pulleys 14 which close as illustrated to grip can 15. Turntable 11 indexes in the direction of the arrow to bring can 15 to a second station 19 where can 15 is tangent to a vacuum gripper wheel 20. Wheel 20 carries a length of seal 25 that is fed through feed rollers 21 and cut off at the correct length by a solenoid-operated knife 22. The cut-off length of seal 25 is wrapped around vacuum gripper wheel 20 and held in the channel 23 around the periphery of wheel 20 between rims 24 by vacuum passageways 26 which are evacuated by communication with an arcuate chamber 27 evacuated by a line 28. Seal 25 is then held in place from its leading end tangent to can 15, to its trailing end adjacent knife 22. Another chamber 29 is evacuated through line 30 to evacuate a passageway 26 tangent to can 15 for applying the leading end of seal 25 to can 15. As passageways 26 rotate beyond chambers 27 and 29, they are no longer evacuated, and need not hold seal 25.

A gear sector 31 under turntable 11 pivots 90° on an arm 32 to engage a gear coaxial with drive pulley 12 at station 19 to rotate drive pulley 12 to turn belt 13 and rotate can 15. Vacuum wheel 20 turns with can 15 to press a cut-off length of seal 25 in place around the rim of can 15. As this happens, a new length of seal 25 moves onto vacuum wheel 20 and is cut off to fit a succeeding can 15.

Then turntable 11 indexes to move can 15 to a third station 33 where a pneumatic cylinder 34 operates a pair of gripper shoes 35 to draw the free ends of wrapped seal 25 together where a heated fusing element 36 fuses the ends of seal 25 together to complete the sealing of can 15.

Then turntable 11 indexes to move can 15 to a fourth station 37 where pulleys 14 are separated by arms 16 and cylinder 17 to release sealed can 15 by tensioning belt 13 between pulleys 14 for moving can 15 off of turntable 11 and onto discharge conveyor belt 38. Can 15 is guided onto conveyor belt 38 by guide rod 39 and is discharged from seal applier 10.

Many different arrangements of belts, pneumatic cylinders, solenoids, drive connections and motors are possible in the inventive seal applier. Also a vacuum gripper wheel for wrapping a seal around a can rim can use a variety of gripping mechanisms and evacuation devices.

Persons wishing to practice the invention should remember that other embodiments and variations can be adaped to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the many variations possible on the inventive seal applier.

I claim:

1. A can seal applier comprising:
   a. an indexing mechanism;
   b. a plurality of endless belt and pulley sets arranged at four stations on said indexing mechanism;
   c. each of said pulley sets including a drive pulley and a pair of movable idler pulleys;
   d. means for closing said movable pulleys against opposite sides of said can at a first station to wrap said endless belt around half of the cylindrical circumference of said can and hold said can on said indexing mechanism;
   e. means for feeding a continuous seal strip to a second station;
   f. means for cutting off a length of said seal strip;
   g. a rotatable vacuum gripper wheel for holding said cut off length of said seal strip;
   h. means for rotating said drive pulley at said second station to rotate said can with said belt;
   i. said vacuum gripper wheel engaging and rotating with said can at said second station to wrap said seal around said can;
   j. said vacuum gripper wheel having rims straddling said seal and a channel between said rims for pressing said seal onto said can to be supported on said can;

k. means at a third station for gripping and joining the free ends of said wrapped seal; and l. means for opening said movable pulleys away from said can at a fourth station to release said can and move said can off said indexing mechanism.

2. The seal applier of claim 1 wherein said vacuum gripper wheel has a plurality of vacuum passageways and means for evacuating said passageways around a gripping portion of the perimeter of said vacuum gripper wheel.

3. The seal applier of claim 2 wherein said evacuating means includes means for evacuating the region tangent to said can.

4. The seal applier of claim 1 wherein said seal gripper and joiner includes shoes for drawing said free ends of said seal together.

5. The seal applier of claim 4 wherein said seal gripping and joining means includes an electric heater element for fusing said free ends of said seal together.

6. The seal applier of claim 5 wherein said vacuum gripper wheel has a plurality of vacuum passageways and means for evacuating said passageways around a gripping portion of the perimeter of said vacuum gripper wheel.

7. The seal applier of claim 6 wherein said evacuating means includes means for evacuating the region tangent to said can.

* * * * *